US 12,045,570 B2

(12) United States Patent
Wentworth

(10) Patent No.: US 12,045,570 B2
(45) Date of Patent: Jul. 23, 2024

(54) MULTI-CLASS TEXT CLASSIFIER

(71) Applicant: S&P Global Inc., New York, NY (US)

(72) Inventor: Thomas Allen Wentworth, New York, NY (US)

(73) Assignee: S&P Global Inc., New York, NY (US)

( * ) Notice: Subject to any disclaimer, the term of this patent is extended or adjusted under 35 U.S.C. 154(b) by 286 days.

(21) Appl. No.: 17/650,825

(22) Filed: Feb. 11, 2022

(65) Prior Publication Data

US 2023/0259706 A1   Aug. 17, 2023

(51) Int. Cl.
*G06F 40/284* (2020.01)
*G06F 40/205* (2020.01)
*G06N 5/022* (2023.01)
*G06Q 10/083* (2024.01)

(52) U.S. Cl.
CPC .......... *G06F 40/284* (2020.01); *G06F 40/205* (2020.01); *G06N 5/022* (2013.01); *G06Q 10/0838* (2013.01)

(58) Field of Classification Search
CPC ...... G06F 40/284; G06F 40/205; G06N 5/022
See application file for complete search history.

(56) References Cited

U.S. PATENT DOCUMENTS

| 8,321,356 B2 * | 11/2012 | Awaida | G06Q 30/0283 |
| | | | 705/400 |
| 2020/0051017 A1 * | 2/2020 | Dujmic | G06V 30/424 |

* cited by examiner

*Primary Examiner* — Daniel C Washburn
*Assistant Examiner* — Athar N Pasha
(74) *Attorney, Agent, or Firm* — Yee & Associates, P.C.

(57) ABSTRACT

A method, system, and product for multi-class text classification. The method includes receiving an uncoded shipping container description comprising an uncoded text; and assigning a predicted HS code segment to the uncoded container description. Assigning includes cleaning the uncoded text of the uncoded container description by removing 1-2 letter words, numbers and symbols from the text; tokenizing the cleaned uncoded text to define a plurality of unencoded tokens by parsing the cleaned uncoded text into single words and bigrams; summing the scores for each of a plurality of HS code segments associated with each of the plurality of unencoded tokens across all of the plurality of unencoded tokens; and determining the predicted HS code segment based on the highest summation. The method can include receiving an uncoded shipping container description comprising an uncoded text; and assigning a predicted HS code segment to the uncoded container description.

39 Claims, 12 Drawing Sheets

MULTI-CLASS TEXT CLASSIFIER

BACKGROUND

1. Field

The disclosure relates generally to an improved computer system and, more specifically, to a method, apparatus, computer system, and computer program product for a multi-class text classifier.

2. Description of the Related Art

The Harmonized System (HS) is a standardized numerical method of classifying traded products that serves as the foundation for the import and export classification systems around the world. The HS assigns specific six-digit codes for varying classifications and commodities. Individual countries can provide for further classification by appending additional codes to the six-digit HS code. Customs authorities use the HS to identify products when assessing duties and taxes and for gathering statistics.

Insights derived from customs records may provide great benefit to a wide range of businesses, individuals, governments, and the like. However, reliance on HS codes for purposes other than assessments may lead to inaccurate conclusions about content, value, volume, weight, container type, and the like of an international shipment. Moreover, some customs records may not include HS codes. Rather than relying solely on HS codes, analysis of customs records may utilize the free-form phrase-like text content found in portions of these customs records. The text fields of the customs records often lack full sentences and may lack complete words that are used in typical natural language communication. For example, they may include fewer than ten words, fewer than five words, fewer than three words, or even contain as few as one or two abbreviations or acronyms that are not defined in non-technical dictionaries. As another example, there may not be an accurate or complete HS code in a customs record, or as mentioned above any HS code at all.

Attempts have been made to adapt natural language processing (NLP) to facilitate analysis and categorization of customs records. Generally, natural language processing has been applied to human language content, such as full sentences of prose or speech, rather than to non-natural language content, such as the terse, jargon-laden, multiple-language content that characterizes customs transaction records. However, in the context of customs records analysis, known natural language processing algorithms, including word-stemming, word-singularizing, syllable, and character sequence analysis, and/or similarity-matched word counting and the like, do not perform as well as desired.

Heretofore, the requirements of analyzing and categorizing customs records referred to above have not been fully met. In view of the foregoing, there is a need in the art for a solution that solves both of these problems.

SUMMARY

There is a need for the following embodiments of the present disclosure. Of course, the present disclosure is not limited to these embodiments.

According to one embodiment of the present invention, a computer-implemented method for text classification, comprises: receiving a training set of shipping container descriptions comprising a plurality of shipping container descriptions each of the plurality of shipping container descriptions comprising an HS code and a text; recording the HS code of each of the plurality of shipping container descriptions to define a plurality of HS code labels; cleaning the text of each of the plurality of shipping container descriptions by removing 1-2 letter words, numbers and symbols from the text of each of the plurality of shipping container descriptions; tokenizing the cleaned text of each of the plurality of shipping container descriptions to define a plurality of tokens by parsing the cleaned text into single words and bigrams; accumulating coincidences between each of the plurality of HS code labels and each of the plurality of tokens, with regard to each of the plurality of shipping container descriptions; and scoring each of the accumulated coincidences to define a score representing correlation between each of the plurality of HS code labels and each of the plurality of tokens based on a total number of occurrences of each of the plurality of tokens and a number of the accumulated coincidences between each of the plurality of HS code labels and each of the plurality of tokens. The computer-implemented method can further comprise: receiving an uncoded shipping container description comprising an uncoded text; and assigning a predicted HS code segment to the uncoded container description comprising: cleaning the uncoded text of the uncoded container description by removing 1-2 letter words, numbers and symbols from the text; tokenizing the cleaned uncoded text to define a plurality of unencoded tokens by parsing the cleaned uncoded text into single words and bigrams; summing the scores for each of a plurality of HS code segments associated with each of the plurality of unencoded tokens across all of the plurality of unencoded tokens; and determining the predicted HS code segment based on the highest summation.

According to another embodiment of the present invention, a computer system comprises: a hardware processor; and a text classifier, in communication with the hardware processor, wherein the text classifier is configured: to receive a training set of shipping container descriptions comprising a plurality of shipping container descriptions each of the plurality of shipping container descriptions comprising an HS code and a text; to record the HS code of each of the plurality of shipping container descriptions to define a plurality of HS code labels; to clean the text of each of the plurality of shipping container descriptions by removing 1-2 letter words, numbers and symbols from the text of each of the plurality of shipping container descriptions; to tokenize the cleaned text of each of the plurality of shipping container descriptions to define a plurality of tokens by parsing the cleaned text into single words and bigrams; to accumulate coincidences between each of the plurality of HS code labels and each of the plurality of tokens, with regard to each of the plurality of shipping container descriptions; and to score each of the accumulated coincidences to define a score representing correlation between each of the plurality of HS code labels and each of the plurality of tokens based on a total number of occurrences of each of the plurality of tokens and a number of the accumulated coincidences between each of the plurality of HS code labels and each of the plurality of tokens. The text classifier can be configured: to receive an uncoded shipping container description comprising an uncoded text; and to assign a predicted HS code segment to the uncoded container description comprising: to clean the uncoded text of the uncoded container description by removing 1-2 letter words, numbers and symbols from the text; to tokenize the cleaned uncoded text to define a plurality of unencoded tokens by parsing the cleaned uncoded text into single words and bigrams; to sum the scores for each of a plurality of HS code segments associated with each of the plurality of unencoded tokens across all of the plurality of unencoded tokens; and to determine the predicted HS code segment based on the highest summation.

According to yet another embodiment of the present invention, a computer program product comprises: a computer readable storage media; and program code, stored on the computer readable storage media, for classifying text, the program code comprising: code for receiving a training set of shipping container descriptions comprising a plurality of shipping container descriptions each of the plurality of shipping container descriptions comprising an HS code and a text; code for recording the HS code of each of the plurality of shipping container descriptions to define a plurality of HS code labels; code for cleaning the text of each of the plurality of shipping container descriptions by removing 1-2 letter words, numbers and symbols from the text of each of the plurality of shipping container descriptions; code for tokenizing the cleaned text of each of the plurality of shipping container descriptions to define a plurality of tokens by parsing the cleaned text into single words and bigrams; code for accumulating coincidences between each of the plurality of HS code labels and each of the plurality of tokens, with regard to each of the plurality of shipping container descriptions; and code for scoring each of the accumulated coincidences to define a score representing correlation between each of the plurality of HS code labels and each of the plurality of tokens based on a total number of occurrences of each of the plurality of tokens and a number of the accumulated coincidences between each of the plurality of HS code labels and each of the plurality of tokens. The program code can further comprise: code for receiving an uncoded shipping container description comprising an uncoded text; and code for assigning a predicted HS code segment to the uncoded container description comprising: cleaning the uncoded text of the uncoded container description by removing 1-2 letter words, numbers and symbols from the text; tokenizing the cleaned uncoded text to define a plurality of unencoded tokens by parsing the cleaned uncoded text into single words and bigrams; summing the scores for each of a plurality of HS code segments associated with each of the plurality of unencoded tokens across all of the plurality of unencoded tokens; and determining the predicted HS code segment based on the highest summation.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that known natural language processing algorithms do not perform as well as desired when applied to terse, jargon-laden, content such as customs transaction records.

Thus, the illustrative embodiments recognize and take into account that it would be desirable to have a method, apparatus, computer system, and computer program product that take into account the issues discussed above as well as other possible issues. For example, it would be desirable to have a method, apparatus, computer system, and computer program product that provide algorithms for determining string alignment with insensitivity to whole-word truncations and translocations.

Embodiments of this disclosure can include custom made multi-class text classification models. Embodiments of this disclosure can include significant performance improvements compared to previous text classification schemes. Embodiments of this disclosure can include simple and explainable logic. Embodiments of this disclosure can include automated retraining. Embodiments of this disclosure can memorizing HS code/token relationships.

In one illustrative example, a method, system and/or computer program product includes a multi-class text classification algorithm based on the idea of exploiting recurring patterns in shipment container descriptions. The algorithm computes a dictionary of token and bigram co-occurrence with some or all HS codes (at granularity of 2, 4 and/or 6 digits) or with other labels. Embodiments of this disclosure can then compute the highest scoring label via a specific scoring function based on an expression that comprises (all_label_counts)/(all_label_counts−label_i_count+0.1) for example. Of course, 0.1 is a constant and can be a different value.

Figure 1:
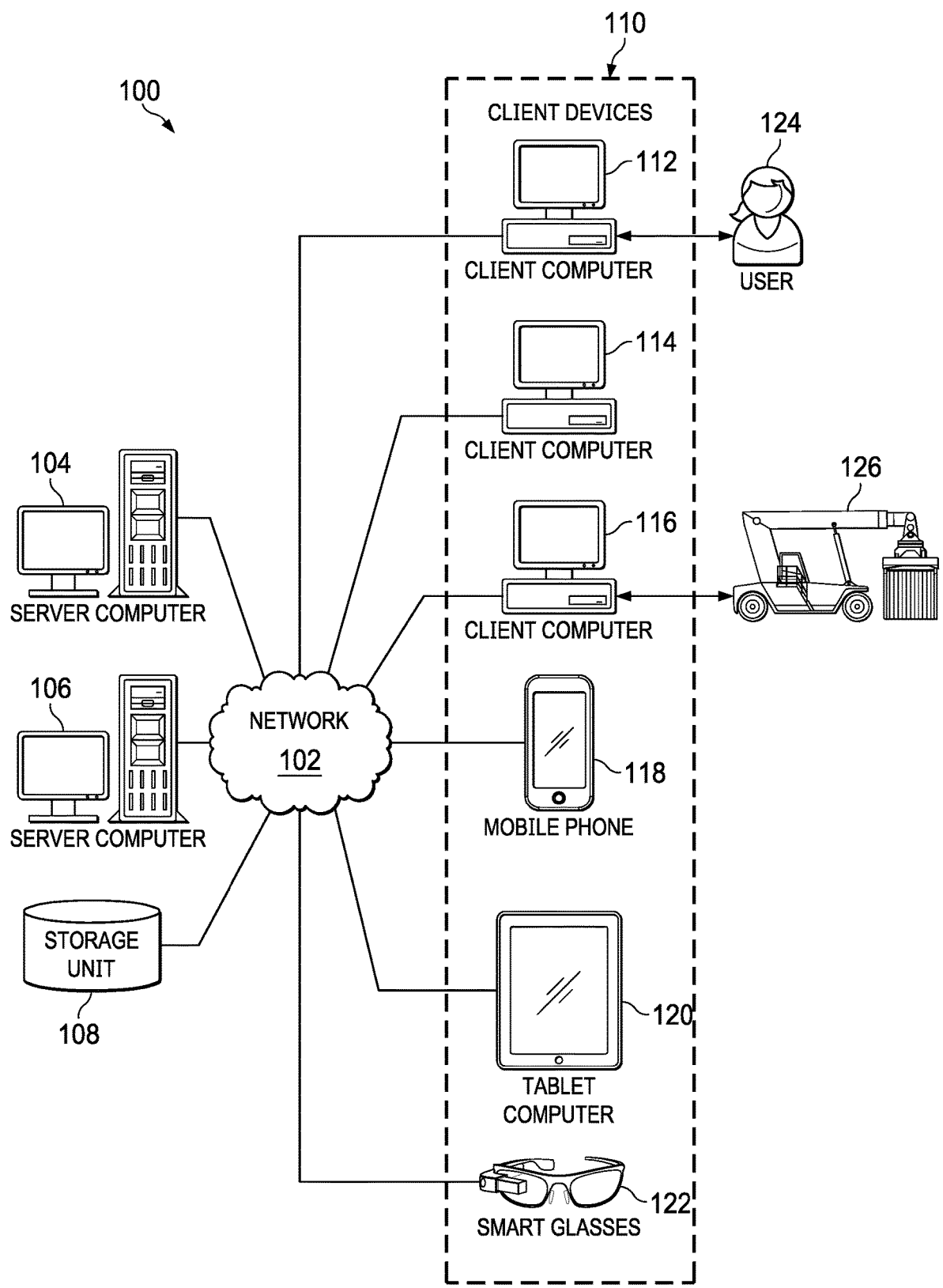
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, smart glasses 122 and shipping container handling equipment 126 for physically moving a shipping container. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110. The program code can include code to search uncoded descriptions using HS codes.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
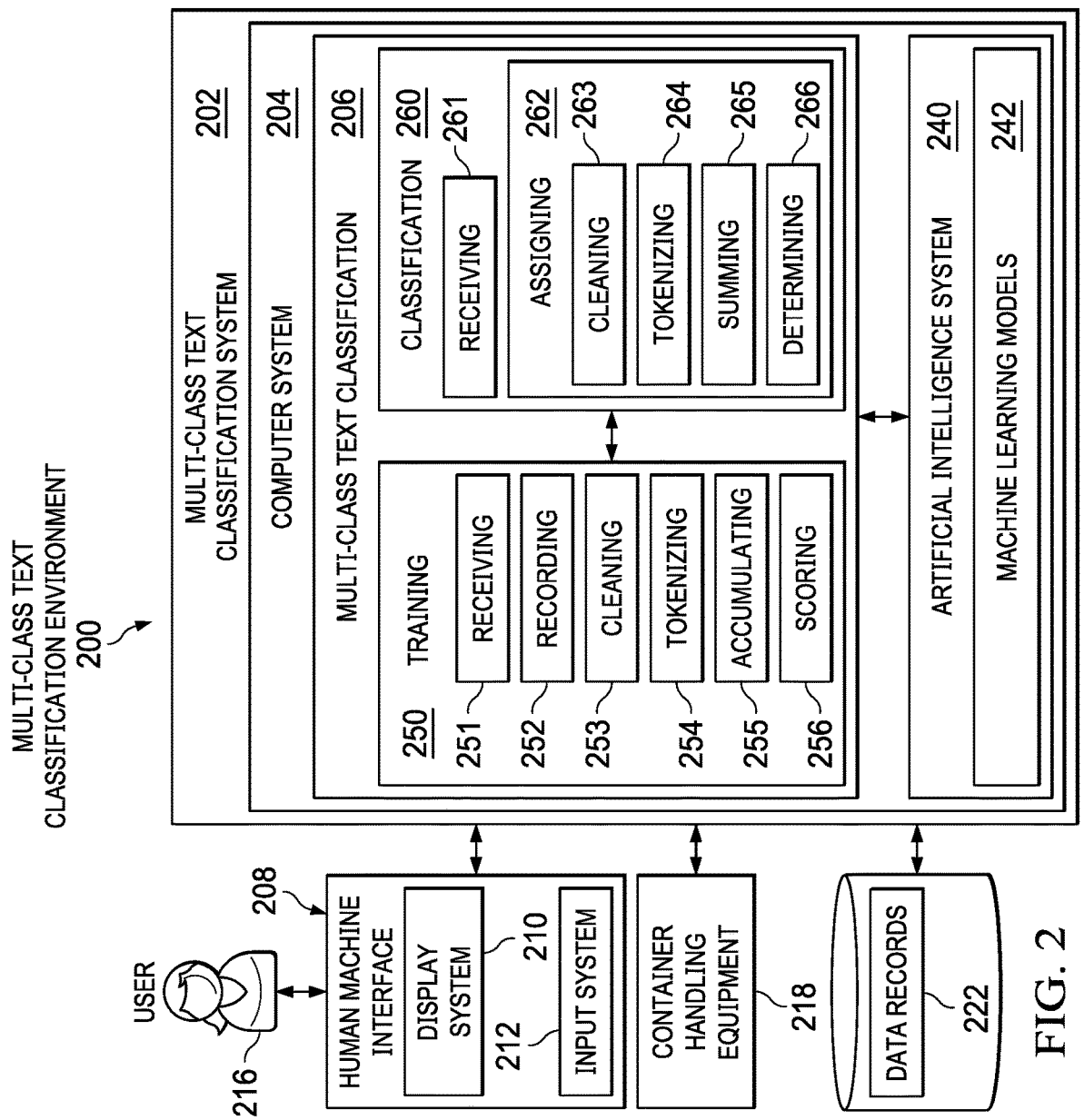
FIG. 2 is a block diagram of a multi-class text classifier environment in accordance with an illustrative embodiment.

With reference now to FIG. 2, a block diagram of a multi-class text classifier environment is depicted in accordance with an illustrative embodiment. In this illustrative example, multi-class text classifier environment 200 includes components that can be implemented in hardware such as the hardware shown in network data processing system 100 in FIG. 1.

As depicted, multi-class text classifier system 202 comprises computer system 204 and multi-class text classifier 206. Multi-class text classifier 206 runs in computer system 204. Multi-class text classifier 206 can be implemented in software, hardware, firmware, or a combination thereof. When software is used, the operations performed by multi-class text classifier 206 can be implemented in program code configured to run on hardware, such as a processor unit. When firmware is used, the operations performed by multi-class text classifier 206 can be implemented in program code and data and stored in persistent memory to run on a processor unit. When hardware is employed, the hardware may include circuits that operate to perform the operations in multi-class text classifier 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 216 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, human machine interface 208 can enable user 216 to interact with one or more computers or other types of computing devices in computer system 204. For example, these computing devices can be client devices such as client devices 110 in FIG. 1.

In this illustrative example, container handling equipment 218 can enable computer system 204 to interact with one or more shipping containers or other types of physical objects. For example, computer system 204 can automatically control movement and/or other processing of a shipping container such as releasing the shipping container from customs and moving the shipping container using container handling equipment 218 from a yard in a port onto a truck chassis or rail car for dispatch to a destination. Container handling equipment 218 can includes one or more client devices such as client devices 110 in FIG. 1.

In this illustrative example, data records 222 provide nonvolatile memory storage for multi-class text classifier 206 in computer system 204. Data records 222 can include historical shipping container descriptions, historical token scores based on those descriptions, and historical classification predictions of those descriptions.

In this illustrative example, multi-class text classifier 206 in computer system 204 is configured for training and determining a predicted classification among a plurality of classes for a shipping container based on a container description. Multi-class text classifier 206 includes training system 250 and classification system 260.

In this illustrative example, training system 250 includes receiving system 251, recording system 252, cleaning system 253, tokenizing system 254, accumulating system 255 and scoring system 256. Receiving system 251 accepts container descriptions with HS codes. Recording system 252 writes to memory the container descriptions. Cleaning system 253 removes 1-2 letter words, numbers, symbols from the descriptions. Tokenizing system 254 finds single words, bigrams and optionally trigrams. Accumulating system 255 counts coincidences between each of the HS codes and each of the tokens. Scoring system 256 calculates a score for each of the accumulated coincidences.

In this illustrative example, classification system 260 includes receiving subsystem 261 and assigning subsystem 262. Assigning subsystem 262 includes cleaning subsystem 263, tokenizing subsystem 264, summing subsystem 265, and determining subsystem 266. Receiving subsystem 261 accepts an uncoded shipping container description. Assigning subsystem 262 assigns a predicted HS code to the description. Cleaning subsystem 263 removes 1-2 letter words, numbers, symbols from the description. Tokenizing subsystem 264 finds single words, bigrams and optionally trigrams in the cleaned description. Summing subsystem 265, Determining subsystem 266 predicts a HS code.

In some illustrative examples, multi-class text classifier 206 can be used by artificial intelligence system 240. Artificial intelligence system 240 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Multi-class text classifier 206 can be used in one or more layers or nodes of artificial intelligence system 240.

Machine learning is used to train the artificial intelligence system. Machine learning involves inputting data to the process and allowing the process to adjust and improve the function of the artificial intelligence system.

In this illustrative example, artificial intelligence system 240 can include a set of machine learning models 242. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output. The algorithms of multi-class text classifier 206 can be employed as machine learning algorithms in one or more of set of machine learning models 242.

In one illustrative example, one or more solutions are present that overcome a problem with the application of natural language processing algorithms to non-natural language content, such as the terse, jargon-laden, multiple-language content that characterizes customs transaction records. As a result, one or more illustrative examples provide algorithms for determining string alignment with insensitivity to translocation, and sensitivity to truncation. These algorithms can be applied in an artificial intelligence system that may result in improved performance in interpretation of data records.

Computer system 204 can be configured to perform at least one of the steps, operations, or actions described in the different illustrative examples using software, hardware, firmware, or a combination thereof. As a result, multi-class text classifier 206 operates as a special purpose computer system in in computer system 204. In particular, multi-class text classifier 206 transforms computer system 204 into a special purpose computer system as compared to currently available general computer systems that do not have multi-class text classifier 206. In this example, multi-class text classifier 206 operates as a tool that can increase at least one of speed, accuracy, or usability of computer system 204. In particular, this increase in performance of computer system 204 can be for the use of artificial intelligence system 240.

In one illustrative example, multi-class text classifier 206 provides for increased accuracy, comprehension and forecasting by artificial intelligence system 240 as compared with using current documentation systems.

The illustration of multi-class text classifier environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Preferred embodiments of this disclosure are multi-class text classifiers. To operate, embodiments of this disclosure can have the following properties/methods.

Word tokenization: The algorithm has the ability to take a string, such as "12 lbs fresh Brazilian banana bunches" and turn it into tokens, bigrams, trigrams and/or N-grams of any length. This includes applying string-cleaning or other transformations to the given string. In this case, our tokens would be: "fresh", "fresh brazilian", "brazilian", "brazilian banana", "banana", "banana bunches", and "bunches".

Store token-label associations: When training, the algorithm stores how often each token appears with each label, where labels are HS codes. This is the operation we perform during training.

Score token-label associations: Given a token (such as "banana"), embodiments of this disclosure can compute a score for its association with each possible label. The scoring function is described below.

Classification: To make a prediction of the class of a given string, embodiments of this disclosure will first tokenize the string. Next, embodiments of this disclosure will compute the token-label score for all tokens and all labels. Then, embodiments of this disclosure will sum these scores by label to compute the total score for every possible label. Finally, the highest scoring label will be taken as the prediction.

The key to making this algorithm work is the scoring function. There are three properties desired when computing scores for potential predictions.

First, low weight given to tokens with little data: If a token only appears a handful of times, it likely isn't significant. The scoring function currently caps the max possible token-label score by how often that token appears.

Second, reward exclusivity: A token that appears more exclusively with a particular label should be considered as a stronger signal than a less exclusive token-label pair. For example, say that the token "fresh" appears with the label meat 30,000 out of 100,000 times, and the token "banana" appears with the label fruit 4,990 out of 5,000 times. In this case, we would believe that the token "banana" has a stronger signal for the label fruit, than the token "fresh" has for the label meat.

Third, take multiple tokens into account: We want to be able to use data from multiple tokens to influence our final prediction. To do this we simply add scores together. For example, consider 3 tokens and how often they appear with various labels:

Fresh: Meat (30%), Fruit (20%), Dairy (15%), others (35%), Total Occurrences: 5000
Brazilian: Lumbar (19%), Fruit (10%), Ore (8%), Meat (5%), others (63%), Total Occurrences 300,000
Bunches: Wire (20%), Fruit (15%), Flowers (14%), others (51%), Total occurrences 30,000

In this case, the algorithm would pick out fruit as the winner as it consistently scored high amongst the various terms.

To achieve the above properties, embodiments of the disclosure can utilize the following objective function:

$$cap = 10^{min\,(totaCount_i,10)/2}$$

$$token_i\,label_j\,score = min\left(cap, \frac{total\ Count_i}{total\ Count_i - token_i\,label_j\,Count + .1}\right)$$

Where:

$totalCount_i$ is the number of times a token was seen across all training data $token_i label_j Count$ is the number of times $token_i$ was seen with $label_j$ Key things to notice here include the following 3 points.

First, this function gets very large as $token_i label_j Count$ gets close to $totalCount_i$, rewarding exclusivity.

Second, the function is bounded above by $10*totalCount_i$.

Third, the cap prevents the function from getting too large. In our data, there can be very specific terms that are associated with a specific company which may not be generalizable. For example, say tokenA appeared 1000 times, all with labeA, and tokenB appeared 50000 times. It is probably fair to assume that tokenB is not actually a better signal than tokenA and instead tokenB just has more shipments.

Computing the score and expressions for doing so will now be described in more depth. This score is computed during training.

Training will now be described.

The user provides a list of strings and labels.

For example:

("Fishing Equipment to catch fish", "123456"), ("Equipment to catch big fish", "123456"), ("Bait used to catch fish", "123211"), ("100 pack M6×3 mm bolts", "223311"), . . .

Let:

$label_1 label_2$, . . . denote particular unique labels. For example, $label_1$="123456"

Compute N-Grams for all provided strings. The N is configurable, however preferred embodiments of this disclosure use tokens and bigrams.

For example, the string "Equipment to catch big fish" has the following:

Tokens (1-Grams): {"Equipment", "to", "catch", "big", "fish"}
Bigrams (2-Grams): {"Equipment to", "to catch", "catch big", "big fish"}
Trigrams (3-Grams): {"Equipment to catch", "to catch big", "catch big fish"}

This particular example uses Tokens and Bigrams.

Let:

$token_1 token_2$, . . . , denote particular unique N-grams that are found. For example, perhaps $token_j$="to catch"

For all N-Grams, count both the total number of occurrences and the number of occurrences associated with each label in the training data.

Let:

$totalCount_j$ denote the total number of times we see $token_j$. In the example training data above, this would be 3.

Let:
tokenⱼlabelᵢCount denote the total number of times we see token$_i$ and label$_j$ together. In the example training data above, this would be 2.

Finally, for every token and label, call them token$_j$ and label$_i$, respectively, we compute a score that quantifies the association of this token-label pair.

Let:

$$\text{token}_i \text{ label}_j \text{ score} = \min\left(10^{\min(totaCount_i,10)/2}, \frac{\text{total Count}_i}{\text{total Count}_i - \text{token}_i \text{ label}_j \text{ Count} + .1}\right)$$

where min is the minimum function that returns the smallest of its inputs.

In the case of HS-Codes, labels are hierarchical, and we consider the first 2, 4, and 6 characters. Since we care about the accuracy of leading digits more, we repeat the above steps considering only the first 2, 4, and 6 digits. The number of digits is configurable. In a preferred embodiment, we use the 2 digit predictions to inform the 4 digit predictions, and the 4 digit predictions to inform the 6 digit predictions. For example, if the 2 digit prediction was "23" we would then only consider 4-eigit HS codes that start with "23" when making the 4-digit prediction.

Predicting will now be described.

The user provides a string for which they want a prediction.

For example: "things to catch fish"

Compute N-grams for the given string. For example, if using tokens and bigrams: {"things", "to", "catch", "fish", "things to", "to catch", "catch fish"}

Set prediction=" "

For L, where L is the number of label digits we want to consider:

For each N-gram, and all possible labels starting with prediction, look up its score. If we never saw a particular (label, N-Gram) pair in the training data, then the score is 0.

For every possible label, lookup and sum the (label, N-gram) score across all N-grams in the string (including repeats). If we never saw a particular (label, N-Gram) pair in the training data, then the score is 0. We now have a summed score for each possible label.

Set prediction=the highest-scoring label. Note that this label will only be L characters long.

Output prediction to the user

During testing, other forms of the equation were tried:
Different values were used in place of $10^{\min(totaCount_i,10)/2}$ $$\text{token}_i \text{ label}_j \text{ score} = \min\left(10^{\min(totaCount_i,10)/2}, \frac{\text{total Count}_i^n}{\text{total Count}_i^n - \text{token}_i \text{ label}_j \text{ Count}^n + .1}\right)$$

$$\text{token}_i \text{ label}_j \text{ score} = \min\left(10^{\min(totaCoun_i,10)/2}, \left(\frac{\text{total Count}_j}{\text{total Count}_j - \text{token}_i \text{ label}_j \text{ Count} + .1}\right)^n\right)$$

$$\text{token}_i \text{ label}_j \text{ score} = \frac{\text{token}_i \text{ label}_j \text{ Count}}{\text{total Count}_j}$$

Alternative embodiments of this disclosure can include use of tri-grams.

Algorithms of the illustrative embodiments modify the traceback procedure of other dynamic programming algorithms. Rather than searching the matrix for the largest score, the illustrative embodiments only look at spots that are associated with a space or the end of the string.

Figure 3:
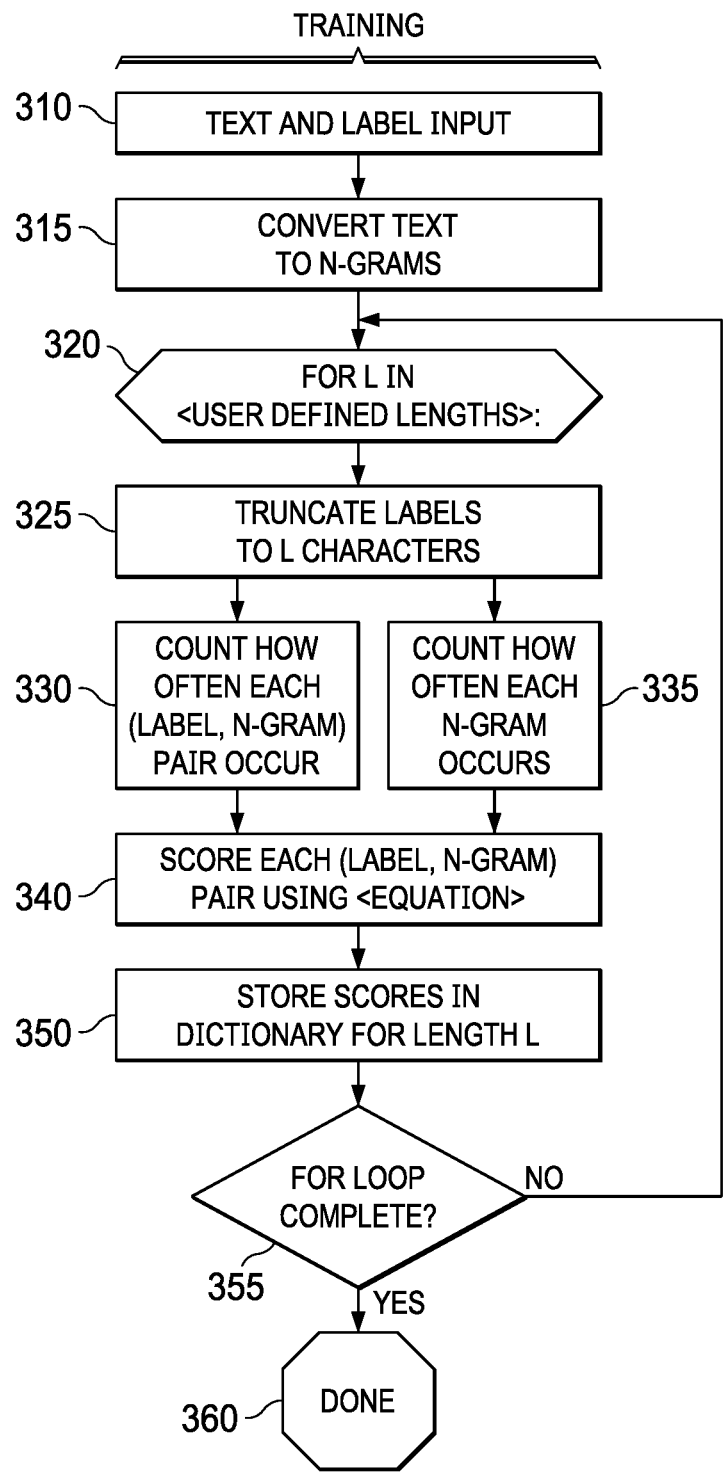
FIG. 3 is a flowchart of a process for training depicted in accordance with an illustrative embodiment.

Turning next to FIG. 3, a flowchart of a process for training is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in training system 250 of multi-class text classifier 206 of computer system 204 in FIG. 2.

The process begins with text and label input (step 310). The text is converted to N-Grams (step 315) to parse the text. An approximation process is begun with L in <user defined lengths>(step 320). Truncate labels to L characters (step 325) generalizes the label. Count how often each (Label N-Gram) pair occur (step 330) accumulates coincidences. Count how often each N-Gram occurs (step 335) accumulates the total number of N-Gram instances. Score each (Label N-Gram) pair using <equation> (step 340) calculates a representation of the correlation between each label and N-Gram. Store scores in dictionary for length L (step 350) writes the scores to memory. For loop complete (step 355) determines if L should be increased to enhance accuracy. If yes, the process loops to step 320 and increments L. If no, the process terminates at done (step 360) thereafter.

Figure 4:
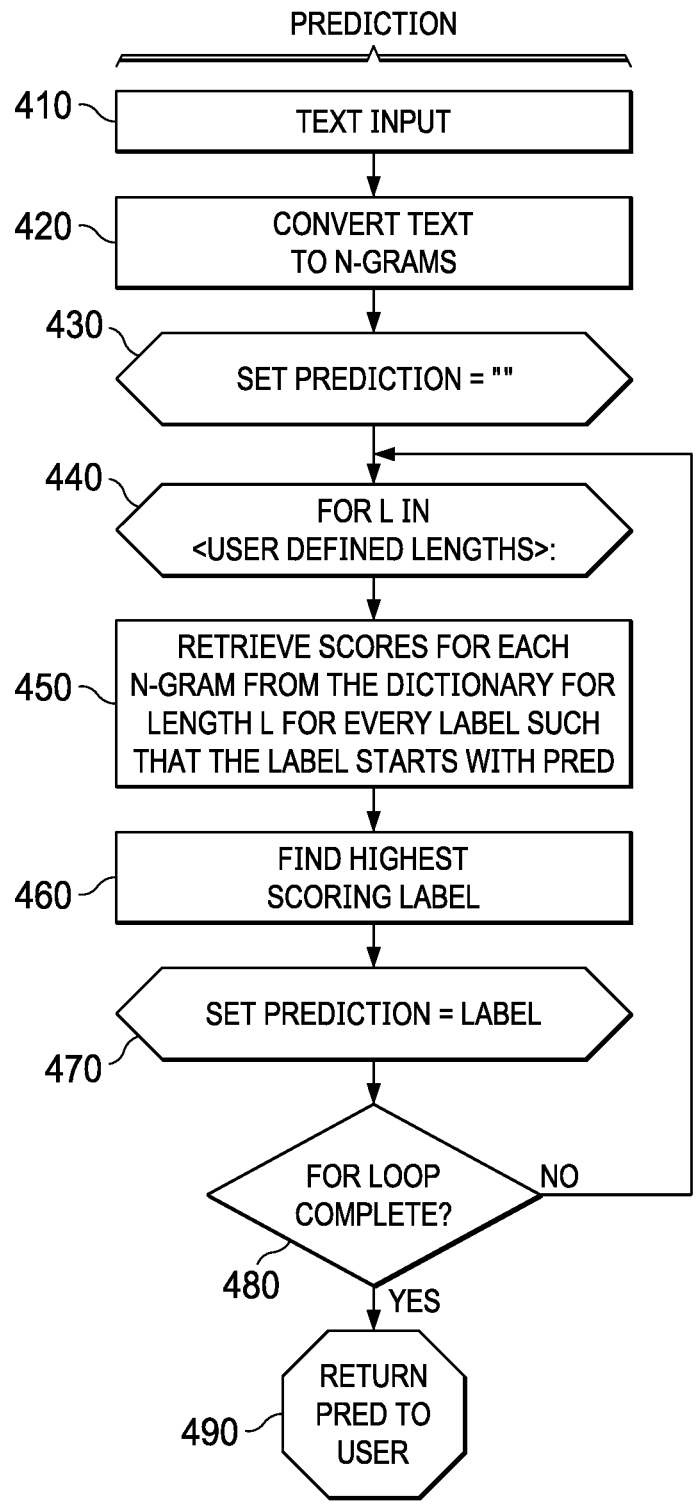
FIG. 4 is a flowchart of a process for prediction depicted in accordance with an illustrative embodiment.

Turning next to FIG. 4, a flowchart of a process for predicting is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in classification system 260 of multi-class text classifier 206 of computer system 204 in FIG. 2.

The process begins with text input (step 410). The text is converted to N-Grams (step 420) to parse the text. Set prediction=" " (step 430) approximates the result using an estimate which can be an open wildcard. An approximation process is begun with L in <user defined lengths>(step 440). Retrieve scores for each N-Gram from the dictionary for length L for every label such that the label starts with prediction (step 450) defines the domain of possibilities based on pred. Find highest scoring label (step 460) identifies the prediction for that L. Set prediction=label resets or sets prediction to the highest scoring label. For loop complete (step 480) determines if L should be increased to enhance accuracy. If yes, the process loops to step 440 and increments L. If no, the process returns the prediction to the user (step 490) and terminates thereafter.

Figure 5:
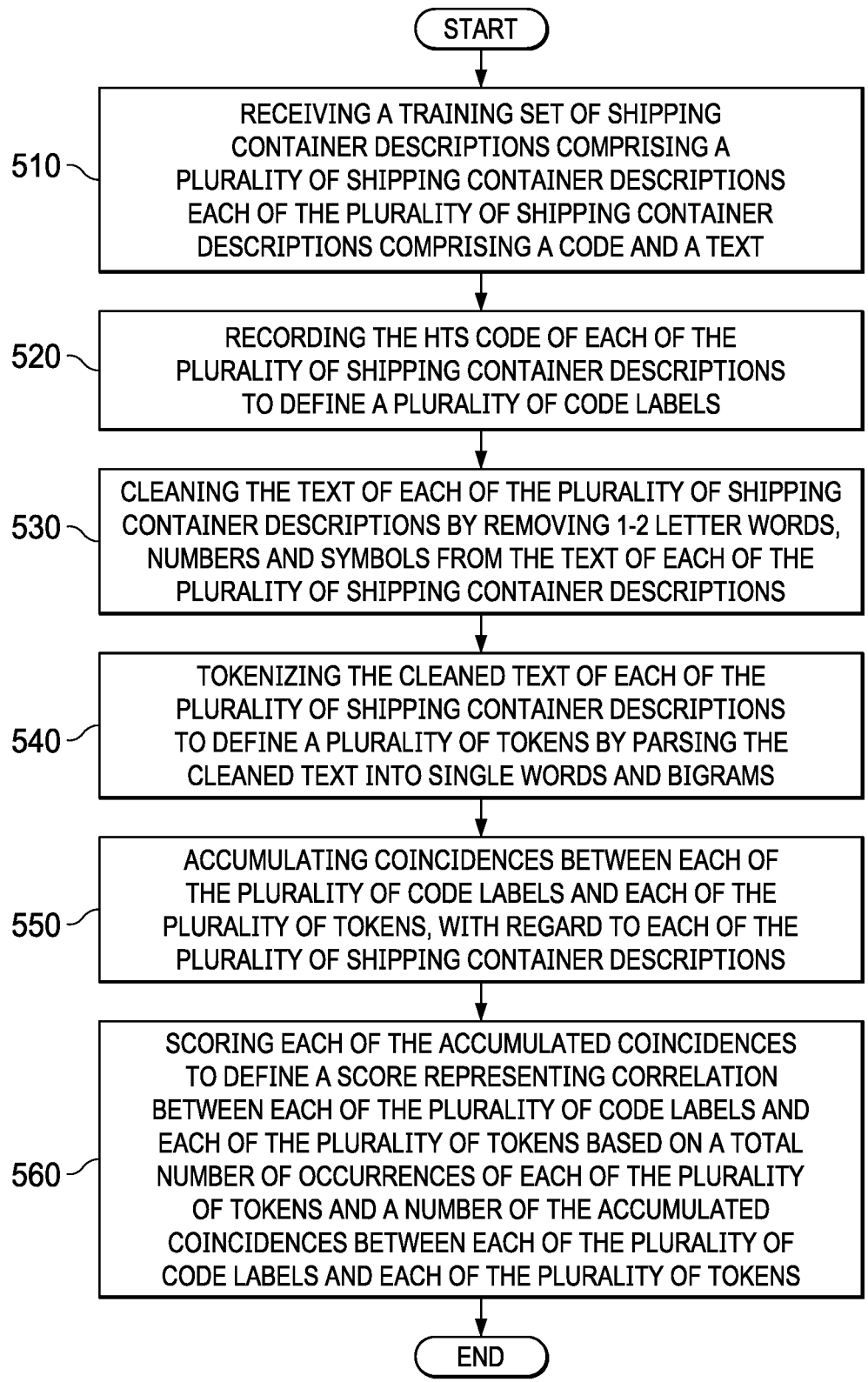
FIG. 5 is a flowchart of a process for training depicted in accordance with an illustrative embodiment.

Turning next to FIG. 5, a flowchart of a process for training is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in training system 250 of multi-class text classifier 206 of computer system 204 in FIG. 2.

The training process begins by receiving a training set of shipping container descriptions comprising a plurality of shipping container descriptions each of the plurality of shipping container descriptions comprising an HS code and a text (step 510). The process then includes recording the HS code of each of the plurality of shipping container descriptions to define a plurality of HS code labels (step 520). The process then includes cleaning the text of each of the plurality of shipping container descriptions by removing 1-2 letter words, numbers and symbols from the text of each of the plurality of shipping container descriptions (step 530). The process then includes tokenizing the cleaned text of each of the plurality of shipping container descriptions to define a plurality of tokens by parsing the cleaned text into single words and bigrams (step 540). The process then includes accumulating coincidences between each of the plurality of HS code labels and each of the plurality of tokens, with regard to each of the plurality of shipping container descriptions (step 550). The process then includes scoring each of the accumulated coincidences to define a score representing correlation between each of the plurality of HS code labels and each of the plurality of tokens based on a total number of occurrences of each of the plurality of tokens and a number of the accumulated coincidences between each of the plurality of HS code labels and each of the plurality of tokens (step 560). The training process terminates thereafter.

Figure 6:
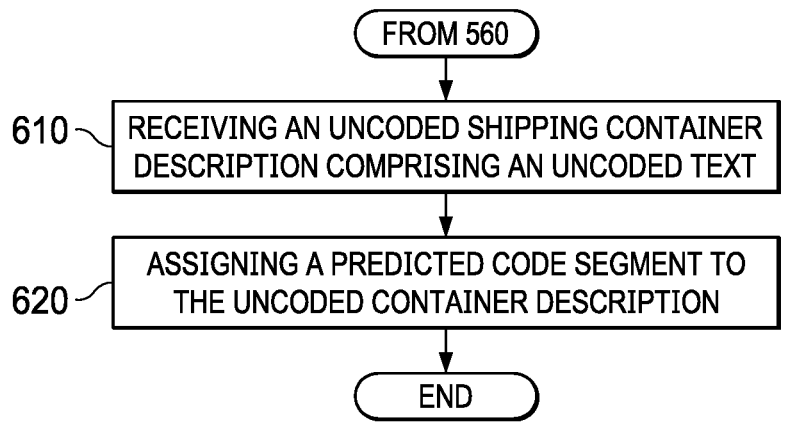
FIG. 6 is a flowchart of a process for prediction depicted in accordance with an illustrative embodiment.

Turning next to FIG. 6, a flowchart of a process for predicting is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in classification system 260 of multi-class text classifier 206 of computer system 204 in FIG. 2.

The training process begins by receiving an uncoded shipping container description comprising an uncoded text (step 610). The process then includes assigning a predicted HS code segment to the uncoded container description (step 620). The training process terminates thereafter.

Figure 7:
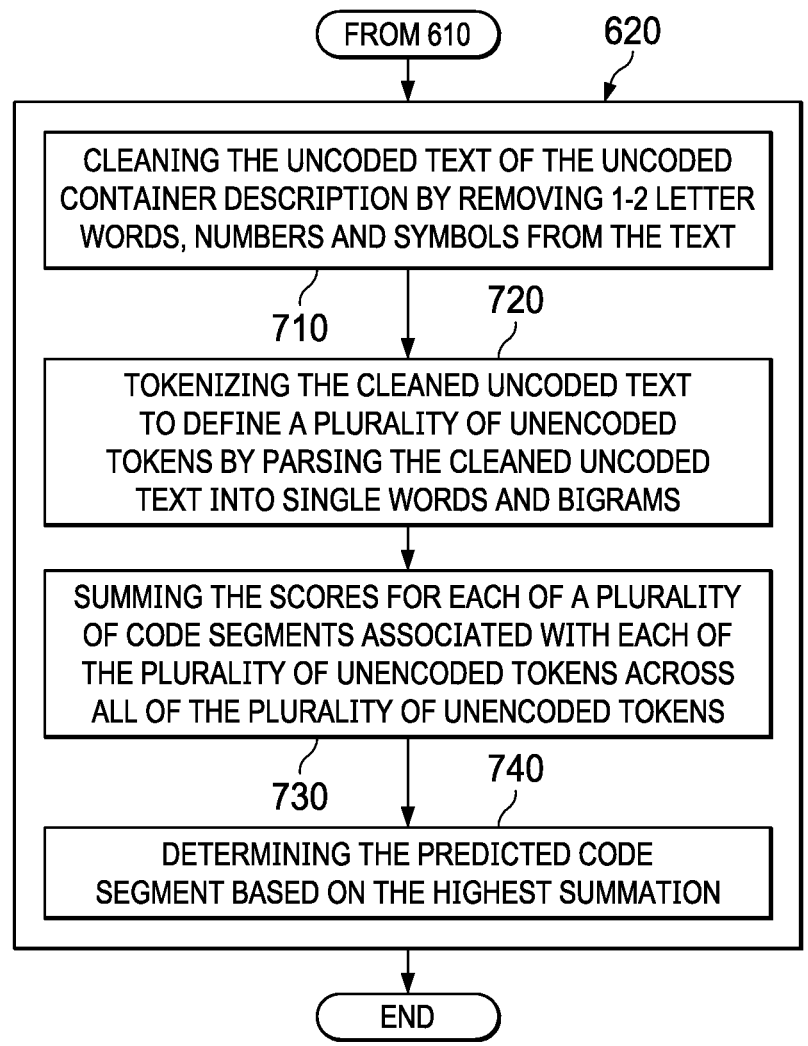
FIG. 7 is a flowchart of a process for assigning a predicted HS code segment depicted in accordance with an illustrative embodiment

Turning next to FIG. 7, a flowchart of a process for assigning a predicted HS code segment is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in step 620 of FIG. 6.

The assigning process begins by cleaning the text of the container description where we do not know an HS code by removing 1-2 letter words, numbers and symbols from the text (step 710). The process then includes tokenizing the cleaned uncoded text to define a plurality of unencoded tokens by parsing the cleaned uncoded text into single words and bigrams (step 720). The process then includes summing the scores for each of a plurality of HS code segments associated with each of the plurality of unencoded tokens across all of the plurality of unencoded tokens (step 730). The process then includes determining the predicted HS code segment based on the highest summation (step 740). The assigning process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Preferred embodiments of this disclosure can include automatic rolling retraining. The retraining can include consideration of recent shipping container descriptions and can be repeated on an automatic rolling basis weekly, monthly, quarterly or another time interval using code for automatic rolling retraining. Thus, embodiments can be configured to retrain.

EXAMPLES

Specific exemplary embodiments will now be further described by the following, nonlimiting examples which will serve to illustrate in some detail various features. The following examples are included to facilitate an understanding of ways in which embodiments of the present disclosure may be practiced. However, it should be appreciated that many changes can be made in the exemplary embodiments which are disclosed while still obtaining like or similar result without departing from the scope of embodiments of the present disclosure. Accordingly, the examples should not be construed as limiting the scope of the present disclosure.

Example 1

Figure 8:
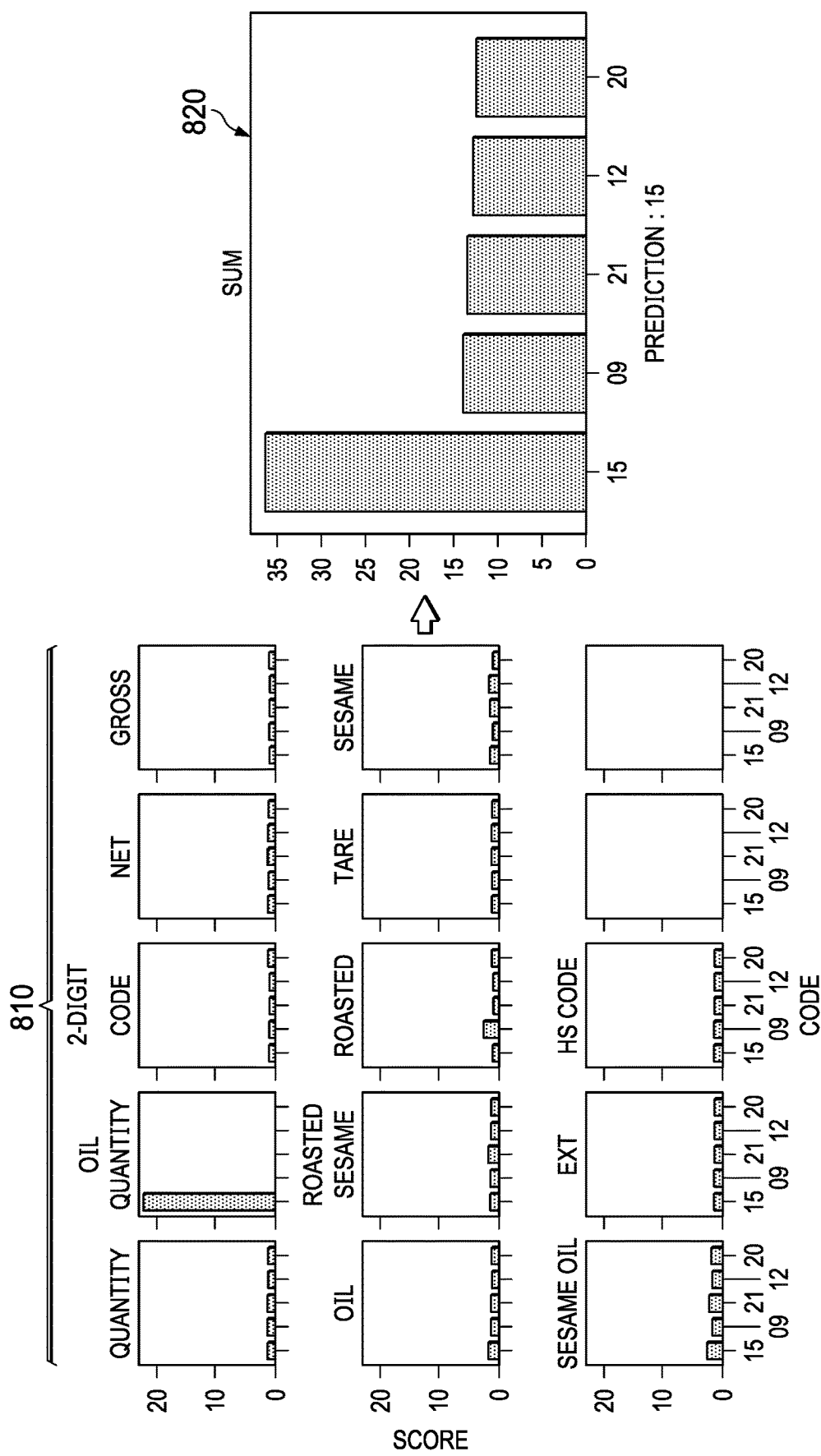
FIG. 8 is a block diagram of five 2 digit HS-Code scores for 15 tokens with a summation yielding a prediction in accordance with an illustrative embodiment.
Figure 9:
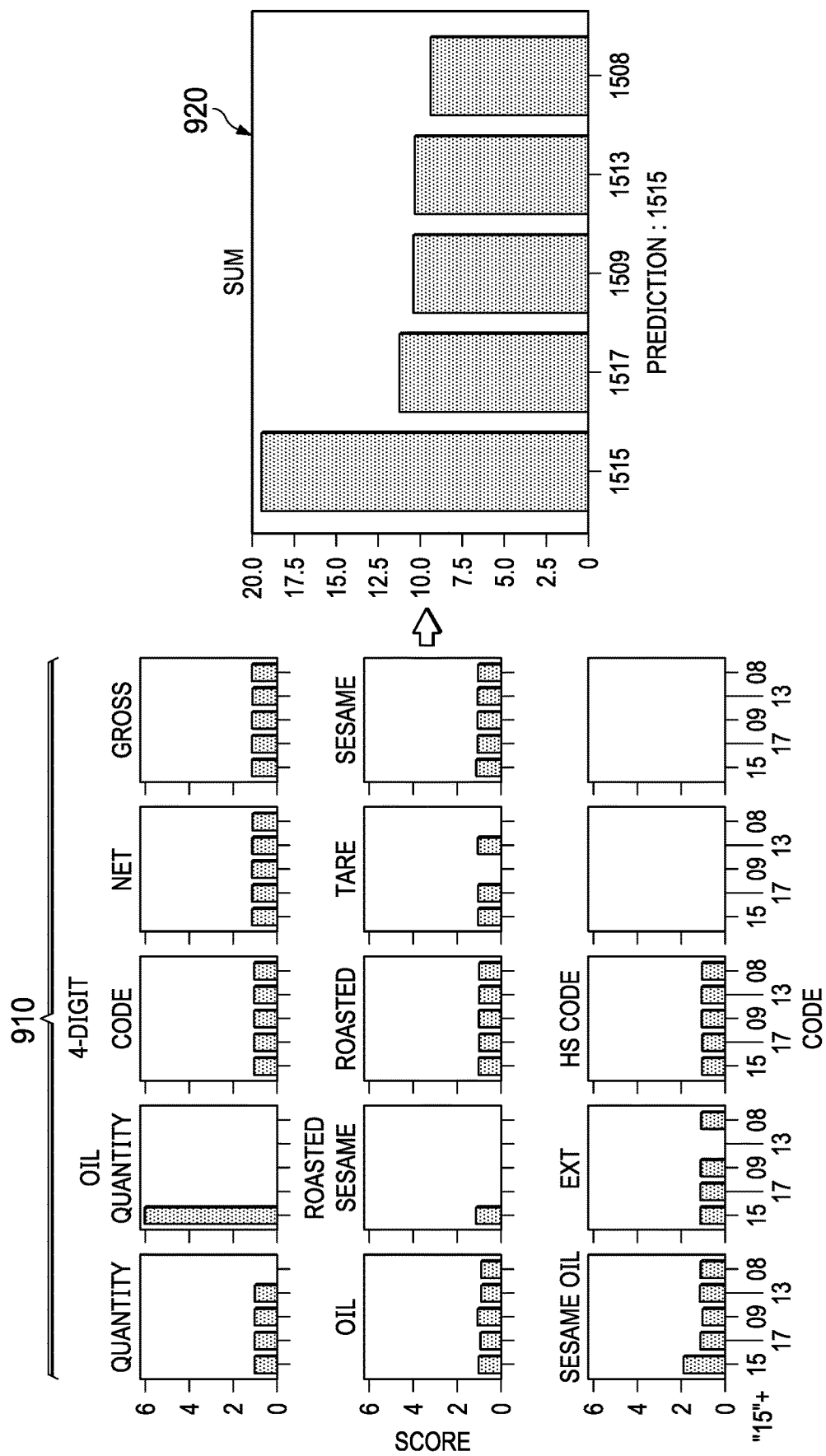
FIG. 9 is a block diagram of five 4 digit HS-Code scores for 15 tokens with a summation yielding a prediction in accordance with an illustrative embodiment.
Figure 10:
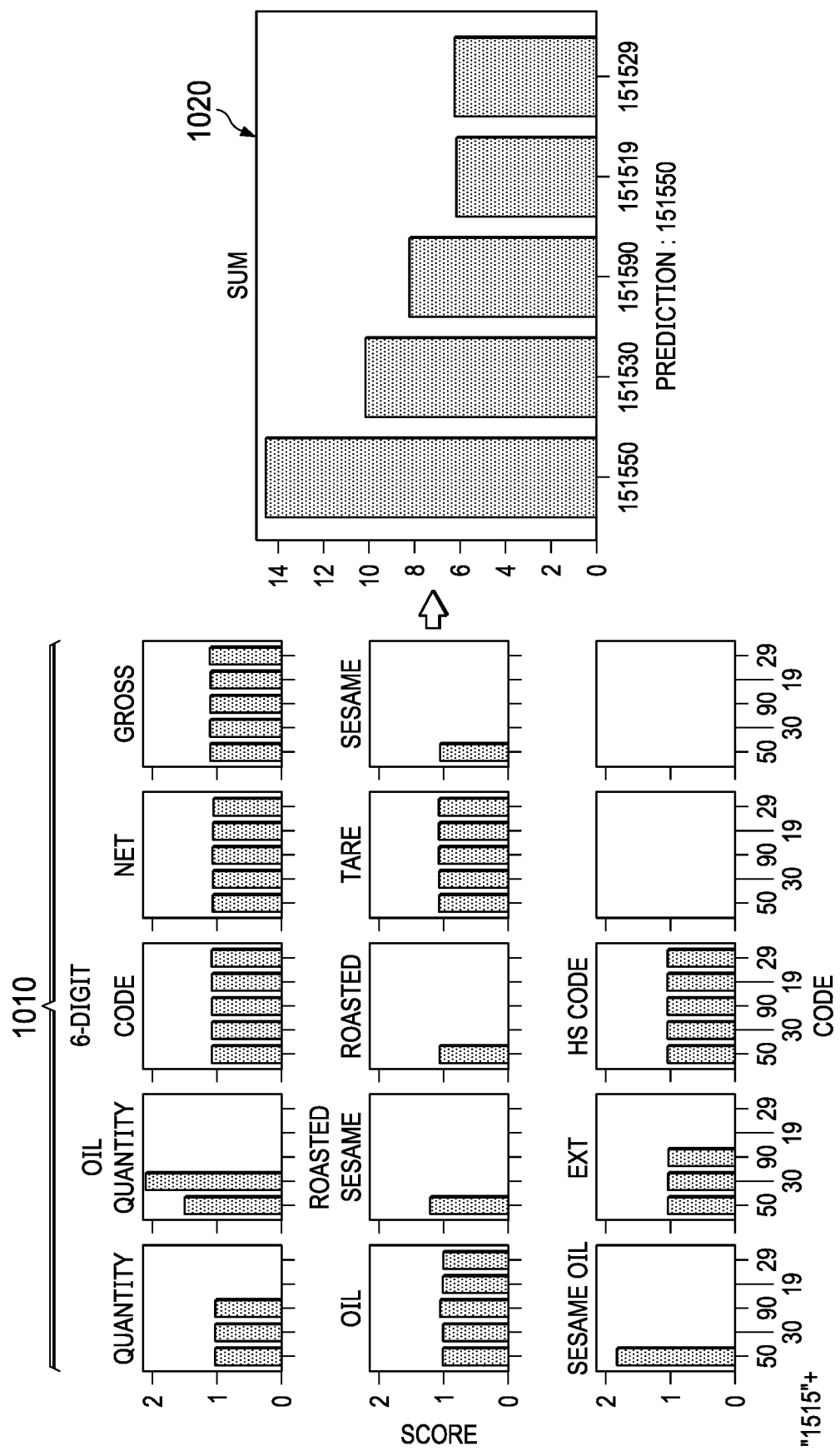
FIG. 10 is a block diagram of five 6 digit HS-Code scores for 15 tokens with a summation yielding a prediction in accordance with an illustrative embodiment.

A prophetic example of an embodiment of this disclosure is illustrated in FIGS. 8-10. The predicting process begins with a container description that does not have an HS code. This description is cleaned. The cleaned description is then tokenized. The prediction is performed for two, 4, and then six digits. Initially a truncated code is used, then a further HS code segment, and then a complete HS code. The previous results restrict the next available results, thus incrementally increasing accuracy.

Turning now to FIG. 8, a 3 by 5 array 810 of 15 tokens at 2 digit resolution is illustrated. Although the full HS codes have more than 2 digits, this first iteration truncates the HS codes to 2 digits. For clarity, the 2 digits listed at the bottom of each column of the array are the same for each of the 15 tokens in the array 810. The scores for all of the tokens are summed with regard to each of the truncated 2 digit HS codes associated with all of the tokens. The 2 digit prediction 820 (i.e. 15) is the highest summed score of all of the tokens with regard to each of the truncated 2 digit HS codes.

Turning now to FIG. 9, a 3 by 5 array 910 of 15 tokens at 4 digit resolution is illustrated. Although the full HS codes have more than 4 digits, this second iteration truncates the HS codes to 4 digits. For clarity, the 2 digits listed at the bottom of each column of the array are the same for each of the 15 tokens in the array 910, and these 2 digits are the least significant digits of the 4 digit truncated HS codes. The scores for all of the tokens are summed with regard to each of 2 least significant digit truncated 4 digit HS codes associated with all of the tokens. The 4 digit prediction 920 (i.e. 1515) is the highest summed score of all of the tokens with regard to each of the truncated 4 digit HS codes.

Turning now to FIG. 10, a 3 by 5 array 810 of 15 tokens at 6 digit resolution is illustrated. Although the full HS codes may have more than 6 digits, this third iteration truncates the HS codes to 6 digits. For clarity, the 2 digits listed at the bottom of each column of the array are the same for each of the 15 tokens in the array 810, and these 2 digits are the least significant digits of the 6 digit truncated HS codes. The scores for all of the tokens are summed with regard to each of 2 least significant digit truncated 6 digit HS codes associated with all of the tokens. The 6 digit prediction 1020 (i.e. 151550) is the highest summed score of all of the tokens with regard to each of the truncated 6 digit HS codes.

Example 2

Figure 11:
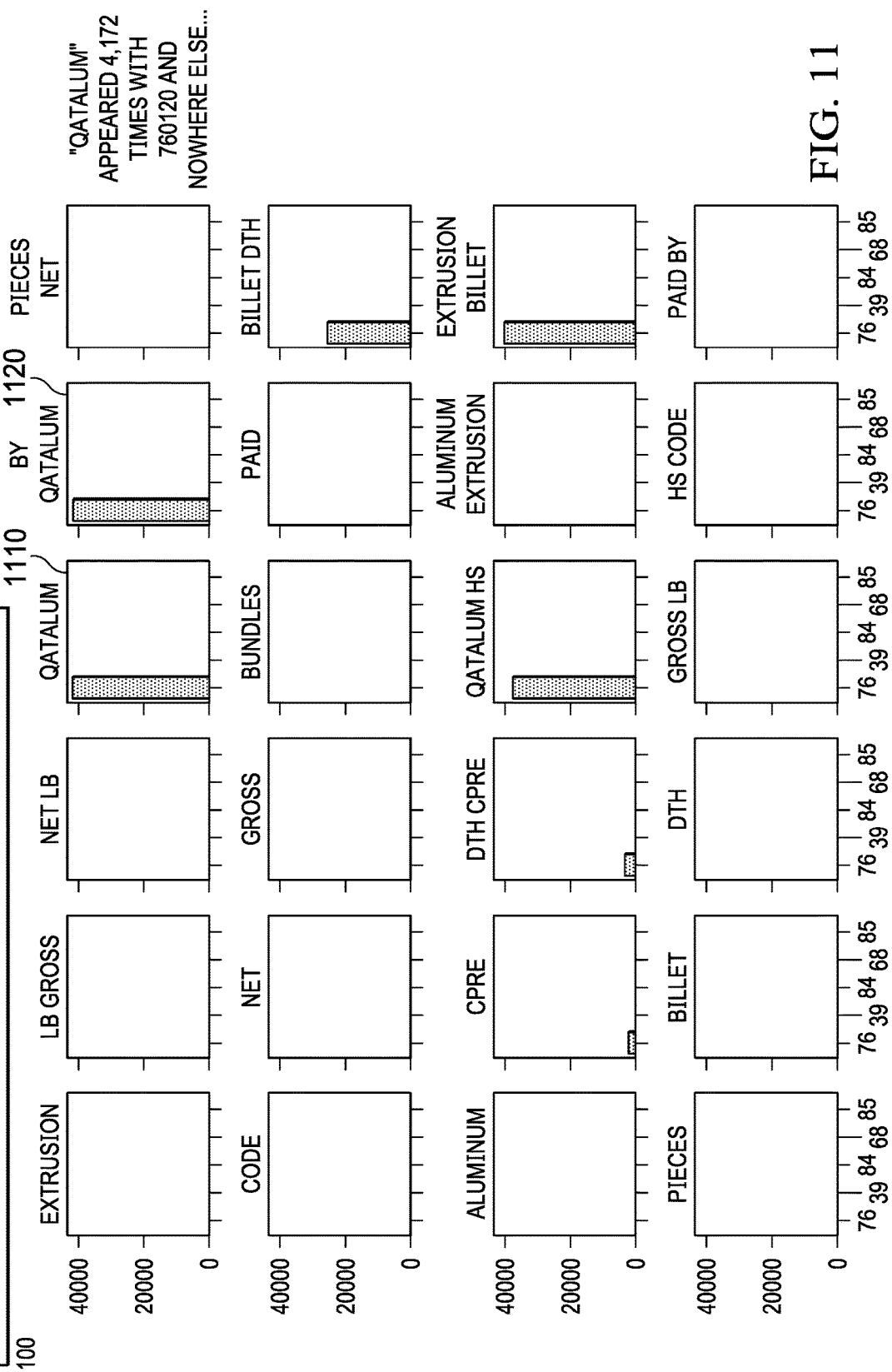
FIG. 11 is a block diagram of five 2 digit HS-Code scores for 24 tokens with a highly specific term yielding a prediction in accordance with an illustrative embodiment.

A prophetic example of an embodiment of this disclosure is illustrated in FIG. 11. This example shows an instance where a highly specific term results in a strong prediction.

Turning now to FIG. 11, the term "qatalum" 1110 appears many times with the code HS-760120 and nowhere else. Incidentally, HS720120 is for "Aluminum unwrought, alloys" and "qatalum" is an aluminum smelter plant. It can be appreciated that the 2 word bigram "by qatalum" 1120 has the same frequency of occurrence.

Example 3

Figure 12:
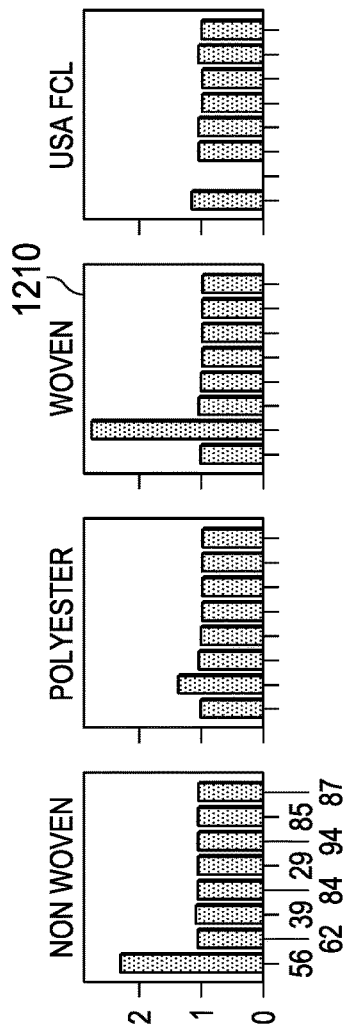
FIG. 12 is a block diagram of eight 2 digit HS-Code scores for 4 tokens with a consensus yielding a prediction in accordance with an illustrative embodiment.

A prophetic example of an embodiment of this disclosure is illustrated in FIG. 12. This example shows an instance where a highly specific term results in a strong prediction.

Turning now to FIG. 12, The highest scoring token 1210 (woven) maps to HS-62, but token 1220 (usa fcl) never appears with HS-62. The 2 digit prediction (56) has the highest summed score.

Figure 13:
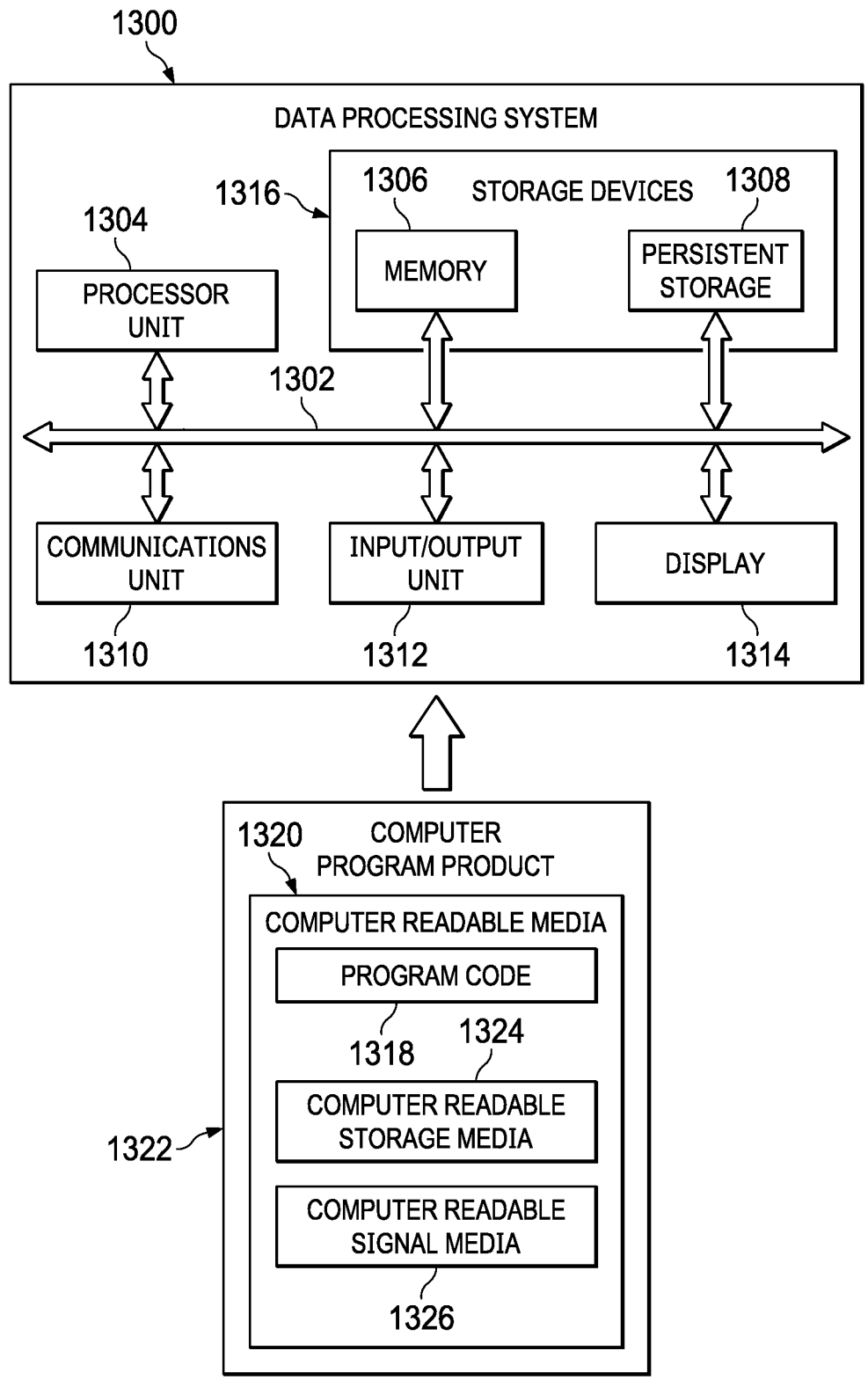
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement server computer 104, server computer 106, client devices 110, in FIG. 1. Data processing system 1300 can also be used to implement computer system 204 in FIG. 2. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are program instructions and are also referred are referred to as program code, computer usable program code, or computer-readable program code that can be read and executed by a processor in processor unit 1304. The program code in the different embodiments can be embodied on different physical or computer-readable storage media, such as memory 1306 or persistent storage 1308.

Program code 1318 is located in a functional form on computer-readable media 1320 that is selectively removable and can be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318. Computer-readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 1318 can be transferred to data processing system 1300 using a computer-readable signal media. The computer-readable signal media are signals and can be, for example, a propagated data signal containing program code 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 1318 can be located in computer-readable media 1320 in the form of a single storage device or system. In another example, program code 1318 can be located in computer-readable media 1320 that is distributed in multiple data processing systems. In other words, some instructions in program code 1318 can be located in one data processing system while other instructions in program code 1318 can be located in one data processing system. For example, a portion of program code 1318 can be located in computer-readable media 1320 in a server computer while another portion of program code 1318 can be located in computer-readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for text classification, comprising:
receiving a training set of shipping container descriptions comprising a plurality of shipping container descriptions each of the plurality of shipping container descriptions comprising a Harmonized System (HS) code and a text;
recording the HS code of each of the plurality of shipping container descriptions to define a plurality of HS code labels;
cleaning the text of each of the plurality of shipping container descriptions by removing 1-2 letter words, numbers and symbols from the text of each of the plurality of shipping container descriptions;
tokenizing the cleaned text of each of the plurality of shipping container descriptions to define a plurality of tokens by parsing the cleaned text into single words and bigrams;
accumulating coincidences between each of the plurality of HS code labels and each of the plurality of tokens, with regard to each of the plurality of shipping container descriptions; and
scoring each of the accumulated coincidences to define a score representing correlation between each of the plurality of HS code labels and each of the plurality of tokens based on a total number of occurrences of each of the plurality of tokens and a number of the accumulated coincidences between each of the plurality of HS code labels and each of the plurality of tokens.

2. The computer-implemented method of claim 1, wherein
the scoring defines the score according to: $token_i label_j score = min(cap, totalCount_i/(totalCount_i - token_i label_j Count + c))$,
wherein $token_i label_j score$ is the score, cap is a limit, $totalCount_i$ is the total number of occurrences of each of the plurality of tokens, $token_i label_j Count$ is the number of the accumulated coincidences between each of the plurality of HS code labels and each of the plurality of tokens, i is a first integer, j is a second integer, and c is a constant, where min is the minimum function that returns the smallest of its inputs.

3. The computer-implemented method of claim 2, wherein cap is $10^{min(totalCount_i/2, 10/2)}$.

4. The computer-implemented method of claim 3, wherein c is 0.1.

5. The computer-implemented method of claim 1, wherein
the scoring defines the score according to: $token_i label_j score = min(10^{min(totalCount_i/2, 10/2)},$ $totalCount_i^n/(totalCount_i^n - token_i label_j Count^n + 0.1))$, wherein $token_i label_j score$ is the score, i is a first integer, j is a second integer, n is a third integer, $totalCount_i$ is the total number of occurrences of each of the plurality of tokens, and $token_i label_j Count$ is the number of the accumulated coincidences between each of the plurality of HS code labels and each of the plurality of tokens, where min is the minimum function that returns the smallest of its inputs.

6. The computer-implemented method of claim 1, wherein
the scoring defines the score according to:
$token_i label_j score = min(10^{min(totalCount_i/2,\ 10/2)},$ $(totalCount_i/(totalCount_i - token_i label_j Count + 0.1)^n))$, wherein $token_i label_j score$ is the score, i is a first integer, j is a second integer, n is a third integer, $totalCount_i$ is the total number of occurrences of each of the plurality of tokens, and $token_i label_j Count$ is the number of the accumulated coincidences between each of the plurality of HS code labels and each of the plurality of tokens, where min is the minimum function that returns the smallest of its inputs.

7. The computer-implemented method of claim 1, wherein
the scoring defines the score according to:
$token_i label_j score = token_i label_j Count/total\ Count_j$,
wherein $token_i label_j score$ is the score, i is a first integer, j is a second integer, $totalCount_i$ is the total number of occurrences of each of the plurality of tokens, $totalCount_j$ is the total number of occurrences of each of the plurality of HS code labels, and $token_i label_j Count$ is the number of the accumulated coincidences between each of the plurality of HS code labels and each of the plurality of tokens.

8. The computer-implemented method of claim 1, further comprising automatic rolling retraining.

9. The computer-implemented method of claim 1, further comprising:
receiving an uncoded shipping container description comprising an uncoded text; and
assigning a predicted HS code segment to the uncoded shipping container description comprising:
cleaning the uncoded text of the uncoded shipping container description by removing 1-2 letter words, numbers and symbols from the text;
tokenizing the cleaned uncoded text to define a plurality of unencoded tokens by parsing the cleaned uncoded text into single words and bigrams;
summing the scores for each of a plurality of HS code segments associated with each of the plurality of unencoded tokens across all of the plurality of unencoded tokens; and
determining the predicted HS code segment based on the highest summation.

10. The computer-implemented method of claim 9, further comprising repeating receiving and assigning using a further HS code segment.

11. The computer-implemented method of claim 9, wherein the HS code segment is a complete HS code.

12. The computer-implemented method of claim 9, further comprising searching uncoded descriptions using HS codes.

13. The computer-implemented method of claim 9, further comprising automatically physically moving a shipping container associated with the uncoded shipping container description.

14. A computer system, comprising:
a hardware processor; and
a text classifier, in communication with the hardware processor, wherein the text classifier is configured:
to receive a training set of shipping container descriptions comprising a plurality of shipping container descriptions each of the plurality of shipping container descriptions comprising a Harmonized System (HS) code and a text;
to record the HS code of each of the plurality of shipping container descriptions to define a plurality of HS code labels;
to clean the text of each of the plurality of shipping container descriptions by removing 1-2 letter words, numbers and symbols from the text of each of the plurality of shipping container descriptions;
to tokenize the cleaned text of each of the plurality of shipping container descriptions to define a plurality of tokens by parsing the cleaned text into single words and bigrams;
to accumulate coincidences between each of the plurality of HS code labels and each of the plurality of tokens, with regard to each of the plurality of shipping container descriptions; and
to score each of the accumulated coincidences to define a score representing correlation between each of the plurality of HS code labels and each of the plurality of tokens based on a total number of occurrences of each of the plurality of tokens and a number of the accumulated coincidences between each of the plurality of HS code labels and each of the plurality of tokens.

15. The computer system of claim 14, wherein
the scoring defines the score according to:
$token_i label_j score = min(cap, totalCount_i/(totalCount_i - token_i label_j Count + c))$,
wherein $token_i label_j score$ is the score, cap is a limit, $totalCount_i$ is the total number of occurrences of each of the plurality of tokens, $token_i label_j Count$ is the number of the accumulated coincidences between each of the plurality of HS code labels and each of the plurality of tokens, i is a first integer, j is a second integer, and c is a constant, where min is the minimum function that returns the smallest of its inputs.

16. The computer system of claim 15, wherein cap is $10^{min(totalCount_i/2,\ 10/2)}$.

17. The computer system of claim 16, wherein c is 0.1.

18. The computer system of claim 14, wherein
the scoring defines the score according to:
$token_i label_j score = min(10^{min(totalCount_i/2,\ 10/2)},$ $totalCount_i^n/(totalCount_i^n - token_i label_j Count^n + 0.1))$, wherein $token_i label_j score$ is the score, i is a first integer, j is a second integer, n is a third integer, $totalCount_i$ is the total number of occurrences of each of the plurality of tokens, and $token_i label_j Count$ is the number of the accumulated coincidences between each of the plurality of HS code labels and each of the plurality of tokens, where min is the minimum function that returns the smallest of its inputs.

19. The computer system of claim 14, wherein
the scoring defines the score according to:
$token_i label_j score = min(10^{min(totalCount_i/2,\ 10/2)},$ $(totalCount_i/(totalCount_i - token_i label_j Count + 0.1)^n))$, wherein $token_i label_j score$ is the score, i is a first integer, j is a second integer, n is a third integer, $totalCount_i$ is the total number of occurrences of each of the plurality of tokens, and $token_i label_j Count$ is the number of the accumulated coincidences between each of the plurality of HS code labels and each of the plurality of tokens, where min is the minimum function that returns the smallest of its inputs.

20. The computer system of claim 14, wherein the scoring defines the score according to: $token_i label_j score = token_i label_j Count / totalCount_j$,
wherein $token_i label_j score$ is the score, i is a first integer, j is a second integer, $totalCount_i$ is the total number of occurrences of each of the plurality of tokens, $totalCount_j$ is the total number of occurrences of each of the plurality of HS code labels, and $token_i label_j Count$ is the number of the accumulated coincidences between each of the plurality of HS code labels and each of the plurality of tokens.

21. The computer system of claim 14, wherein the text classifier is configured to retrain on an automatic rolling basis.

22. The computer system of claim 14, wherein the text classifier is configured:
to receive an uncoded shipping container description comprising an uncoded text; and
to assign a predicted HS code segment to the uncoded shipping container description comprising:
  to clean the uncoded text of the uncoded shipping container description by removing 1-2 letter words, numbers and symbols from the text;
  to tokenize the cleaned uncoded text to define a plurality of unencoded tokens by parsing the cleaned uncoded text into single words and bigrams;
  to sum the scores for each of a plurality of HS code segments associated with each of the plurality of unencoded tokens across all of the plurality of unencoded tokens; and
  to determine the predicted HS code segment based on the highest summation.

23. The computer system of claim 22, wherein the text classifier is configured:
to repeat receiving and assigning using a further HS code segment.

24. The computer system of claim 22, wherein the HS code segment is a complete HS code.

25. The computer system of claim 22, wherein the text classifier is configured:
to search uncoded descriptions using HS codes.

26. The computer system of claim 22, wherein the text classifier is configured:
to automatically physically move a shipping container associated with the uncoded shipping container description.

27. A computer program product comprising:
a computer readable storage media; and
program code, stored on the computer readable storage media, for classifying text, the program code comprising:
code for receiving a training set of shipping container descriptions comprising a plurality of shipping container descriptions each of the plurality of shipping container descriptions comprising a Harmonized System (HS) code and a text;
code for recording the HS code of each of the plurality of shipping container descriptions to define a plurality of HS code labels;
code for cleaning the text of each of the plurality of shipping container descriptions by removing 1-2 letter words, numbers and symbols from the text of each of the plurality of shipping container descriptions;
code for tokenizing the cleaned text of each of the plurality of shipping container descriptions to define a plurality of tokens by parsing the cleaned text into single words and bigrams;
code for accumulating coincidences between each of the plurality of HS code labels and each of the plurality of tokens, with regard to each of the plurality of shipping container descriptions; and
code for scoring each of the accumulated coincidences to define a score representing correlation between each of the plurality of HS code labels and each of the plurality of tokens based on a total number of occurrences of each of the plurality of tokens and a number of the accumulated coincidences between each of the plurality of HS code labels and each of the plurality of tokens.

28. The computer program product of claim 27, wherein the scoring defines the score according to: $token_i label_j score = min(cap, totalCount_i/(totalCount_i - token_i label_j Count + c))$,
wherein $token_i label_j score$ is the score, cap is a limit, $totalCount_i$ is the total number of occurrences of each of the plurality of tokens, $token_i label_j Count$ is the number of the accumulated coincidences between each of the plurality of HS code labels and each of the plurality of tokens, i is a first integer, j is a second integer, and c is a constant, where min is the minimum function that returns the smallest of its inputs.

29. The computer program product of claim 28, wherein cap is $10^{min(totalCount_i/2,\ 10/2)}$.

30. The computer program product of claim 29, wherein c is 0.1.

31. The computer program product of claim 27, wherein the scoring defines the score according to: $token_i label_j score = min(10^{min(totalCount_i/2,\ 10/2)}$, $totalCount_i^n/(totalCount_i^n - token_i label_j Count^n + 0.1))$, wherein $token_i label_j score$ is the score, i is a first integer, j is a second integer, n is a third integer, $totalCount_i$ is the total number of occurrences of each of the plurality of tokens, and $token_i label_j Count$ is the number of the accumulated coincidences between each of the plurality of HS code labels and each of the plurality of tokens, where min is the minimum function that returns the smallest of its inputs.

32. The computer program product of claim 27, wherein the scoring defines the score according to: $token_i label_j score = min(10^{min(totalCount_i/2,\ 10/2)}$, $(totalCount_i/(totalCount_i - token_i label_j Count + 0.1)^n))$, wherein $token_i label_j score$ is the score, i is a first integer, j is a second integer, n is a third integer, $totalCount_i$ is the total number of occurrences of each of the plurality of tokens, and $token_i label_j Count$ is the number of the accumulated coincidences between each of the plurality of HS code labels and each of the plurality of tokens, where min is the minimum function that returns the smallest of its inputs.

33. The computer program product of claim 27, wherein the scoring defines the score according to: $token_i label_j score = token_i label_j Count / totalCount_j$,
wherein $token_i label_j score$ is the score, i is a first integer, j is a second integer, $totalCount_i$ is the total number of occurrences of each of the plurality of tokens, $totalCount_j$ is the total number of occurrences of each of the plurality of HS code labels, and $token_i label_j Count$ is the number of the accumulated coincidences between each of the plurality of HS code labels and each of the plurality of tokens.

34. The computer program product of claim 27, the program code further comprising code for automatic rolling retraining.

35. The computer program product of claim 27, the program code further comprising:

code for receiving an uncoded shipping container description comprising an uncoded text; and code for assigning a predicted HS code segment to the uncoded shipping container description comprising:

cleaning the uncoded text of the uncoded shipping container description by removing 1-2 letter words, numbers and symbols from the text;

tokenizing the cleaned uncoded text to define a plurality of unencoded tokens by parsing the cleaned uncoded text into single words and bigrams;

summing the scores for each of a plurality of HS code segments associated with each of the plurality of unencoded tokens across all of the plurality of unencoded tokens; and determining the predicted HS code segment based on the highest summation.

36. The computer program product of claim 35, the program code further comprising code to repeat receiving and assigning using a further HS code segment.

37. The computer program product of claim 35, wherein the HS code segment is a complete HS code.

38. The computer program product of claim 35, the program code further comprising code to search uncoded descriptions using HS codes.

39. The computer program product of claim 35, the program code further comprising code to automatically physically move a shipping container associated with the uncoded shipping container description.

\* \* \* \* \*